United States Patent
Graf

[15] 3,695,152
[45] Oct. 3, 1972

[54] AQUEOUS SET INITIATORS FOR SLURRY SEALS

[72] Inventor: Peter E. Graf, Orinda, Calif.

[73] Assignee: Chevron Research Company, San Francisco, Calif.

[22] Filed: Aug. 5, 1970

[21] Appl. No.: 61,521

[52] U.S. Cl. .................... 94/23, 94/25, 106/277, 106/280, 106/283, 117/92, 117/100, 117/123, 117/168, 117/169
[51] Int. Cl. .......... C09j 3/30, C10b 55/00, C10c 3/00
[58] Field of Search ................ 106/277–283, 123, 106/269, 308 B, 309; 117/100, 92, 123, 168, 169; 94/20–25; 252/311.5; 259/149, 161

[56] References Cited

UNITED STATES PATENTS

| | | | |
|---|---|---|---|
| 2,898,223 | 8/1959 | Detrick | 106/277 |
| 2,488,252 | 10/1949 | Wood | 106/280 X |
| 2,760,878 | 8/1956 | Lhorty | 106/269 |
| 2,773,777 | 12/1956 | Alexander et al. | 106/277 X |
| 2,861,004 | 11/1958 | Sucetti | 106/277 |
| 3,128,997 | 4/1964 | Young | 106/283 X |
| 3,206,174 | 9/1965 | Young | 106/283 X |
| 3,243,311 | 3/1966 | Rogers et al. | 106/280 |
| 3,513,005 | 5/1970 | Bradshaw et al. | 106/277 |
| 2,587,990 | 3/1952 | Gardner et al. | 106/277 UX |

*Primary Examiner*—Joan B. Evans
*Attorney*—J. A. Buchanan, Jr., G. F. Magdeburger, C. J. Tonkin and B. G. Fehringer

[57] ABSTRACT

Quick-set slurry seals are provided by contacting a mixture of aggregate and bitumen emulsion employing sulfonate or sulfate emulsifiers with a water soluble polyvalent metal set initiator in an aqueous medium at high pH.

9 Claims, No Drawings

AQUEOUS SET INITIATORS FOR SLURRY SEALS

BACKGROUND OF THE INVENTION

1. Field Of The Invention

Slurry seals are used for surface repair and maintenance to provide rapid repair of pavements so as to minimize the time for which the pavement is closed to traffic and to prolong the life of existing pavements. Conventional slurry seal mixes cure by dehydration. This requires many hours during which the roadway must be closed to traffic.

Recently slurry seal mixes have been developed which set by chemical reaction between the components of the mix. These systems rapidly develop strength and will tolerate rolling traffic within an hour of being placed. The reactive nature of this system makes it sensitive to the chemical composition of the system. These variables need to be carefully controlled to achieve good performance.

The first requirement is the pot life. The slurry seal must be capable of being mixed for a reasonable length of time to provide a relatively homogeneous composition when spread on the pavement. Therefore, the emulsion must not break and lose the water during the time in which it is being mixed.

The second requirement is the rate at which the emulsion loses sufficient water to form a structure of substantial strength. It is important that the emulsion break rapidly losing a significant proportion of the water and set to a hard cohesive usable structure to permit early opening of the pavement to traffic.

The third requirement which is critical is that upon the breaking of the emulsion, a cohesive structure is set up. It is found that depending on the conditions, the emulsion may be broken and individual clumps of asphalt-aggregate formed. The clumps do not adhere to one another and, therefore, do not provide a cohesive structure. Such pavement would have little practical use.

2. Description Of The Prior Art

Copending application Ser. No. 757,137, filed Sept. 3, 1968, teaches a quick-set slurry seal employing a sulfonate emulsifier and an alkaline filler such as Portland cement or hydrated lime. Patents of interest in this area are U.S. Pat. Nos. 3,513,005, 3,206,174, 2,773,777 and 2,488,252.

SUMMARY OF THE INVENTION

An improved method is provided for preparing slurry seal pavement permitting careful control of the rate and nature of the slurry seal set. In relatively rapid order with continuous mixing, an aqueous solution of a multivalent cation at a high pH is mixed with mineral aggregate, an anionic bitumen emulsion is added to the wet aggregate and the resulting slurry seal then spread onto the pavement. The emulsion breaks with development of a strong coherent structure and expulsion of water from the mix. The early development of strength provides a pavement which may be used within a short time of being laid.

DESCRIPTION OF THE SPECIFIC EMBODIMENTS

In laying pavements of quick-set slurry seals, normal slurry seal equipment can be employed. This equipment is described in such patents as U.S. Pat. Nos. 3,128,997 and 3,206,174. The equipment normally provides means for metering aggregate into a mixing container while moving the aggregate toward the discharge outlet. Fines are added to the aggregate followed by wetting water and bitumen emulsion. The entire mix is then discharged into a slurry seal spreader.

In the present invention aggregate is introduced into the mixing container and then wetted with water at a pH of at least 11. The hydroxide concentration in the water will usually range from a pH of 11.5 to a concentration of one normal in hydroxide, more usually in the pH range of from about 12 to 13.

A multivalent cation in an aqueous medium is also added to the aggregate. Depending on the particular metal cation employed, the metal cation may be present in the water or may be added as a separate solution, or may be mixed with the wetting water immediately prior to the addition to the aggregate. The method chosen depends on the solubility of the metal cation at the high pH level, and the degree to which it becomes coordinated with hydroxide to form an anion. If the cation is one of low solubility, it will normally be added separately from the aqueous base, either simultaneously with or shortly after the addition of the aqueous base. Preferably, the addition of the multivalent cation is shortly before the addition of the anionic bitumen emulsion, but may be simultaneous with the addition of the anionic bitumen emulsion to the wet aggregate.

Mixing is continued during the addition and when the mix is substantially homogeneous, it is spread out onto the pavement and allowed to set. When properly carried out, the emulsion coalesces and the slurry seal sets rapidly, forming a cohesive structure having significant strength within a short time. The pavement may be used as early as one-half hour after laying, but will continue to build up its strength over a period of one or two days. Normally, the pavement is at least about 0.2 inch in thickness, does not exceed 0.5 inch, and is more usually 0.25 to 0.4 inch in thickness.

As already indicated, the laying of a quick-setting slurry seal is particularly sensitive to a wide variety of conditions and variations in materials. Therefore, only the more practical limits will be indicated as to the conditions and the materials, and suggestions made as to the modifications required with particular systems or where one may be working under unusual conditions.

Usually, the mixing of all of the components will take from about ½ minute to 5 minutes, more usually from about 1 minute to about 2 minutes. The water containing base (hydroxide) is added to the aggregate. The aqueous hydroxide may contain the multivalent cation or the aqueous solution of the multivalent cation may be added shortly thereafter or concomitant with the bitumen emulsion. Preferably, a portion of the aqueous hydroxide solution is added to prewet the aggregate. The portion may be from one-quarter to one-half of the total aqueous hydroxide solution added. After the components are added, the mixing may then be carried out for about 1 to 5 minutes, more usually from about 1 to 2 minutes. The whole operation may be carried out continuously, moving the various materials along as one adds the individual ingredients as appropriate.

The individual ingredients will be considered first, and then the proportions of the various materials indicated.

The first material to be considered is the aggregate. The aggregate will normally be a mineral aggregate. The aggregate will have particles of a size in the range of about 4 to passing 200 mesh, U.S. Standard sieve. Either siliceous or limestone mineral aggregate may be used, such as fine sand, and/or crusher dust, crushed granites, cement slag, or mixtures thereof. The size of the aggregate particles will be within the ranges normally specified for slurry seal work. See the Asphalt Handbook, Revised Edition, The Asphalt Institute, College Park, Maryland, September 1960, pp. 216–218, for example. Also see p. 60 for particle size.

With the poorly soluble multivalent metal hydroxides an aqueous solution of an alkali metal base is added to the aggregate. Alkali metal hydroxides which find use are lithium hydroxide, sodium hydroxide or potassium hydroxide, preferably sodium hydroxide. The cation is not significant as long as it is monovalent and provides a solution at the necessary pH. The pH of the aqueous solution must be at least 11, preferably at least 11.5 and preferably in the range of 12 to 13. The hydroxyl concentration will generally not exceed one normal.

With water soluble multivalent metal hydroxides, the metal hydroxide may be used, provided that the appropriate concentrations of the metal cation and hydroxide are obtained. Otherwise, the multivalent cations are added as a separate aqueous solution of an appropriate salt.

Group IIA and IIIA metals are employed, having an atomic number of from 12 to 56. As a practical matter, only calcium, magnesium, strontium, aluminum or barium will be employed with calcium particularly preferred. The associated anion may be any anion which provides the necessary solubility. Conveniently, the anion may be halide—particularly chloride—nitrate, sulfate, etc. Illustrative salts include calcium chloride, calcium bromide, magnesium chloride, barium acetate, barium bromate, magnesium formate, magnesium perchlorate, aluminum sulfate, aluminum nitrate, etc.

The remaining component in the mixture is the anionic bitumen emulsion. The emulsion will normally have from about 50 to 70 weight percent paving bitumen, more usually from about 55 to 65 weight percent paving bitumen. The bitumen usually employed is asphalt, having a penetration at 77° F of from about 40 to 110. The emulsifier will be present in from about 0.2 to 2 weight percent, more usually from about 0.4 to about 1 weight percent. Other additives may also be present, their amounts varying from about 0.05 to 3 weight percent. The remainder of the emulsion will be water, varying usually from about 25 to 49.8 weight percent.

Included among the other additives which may be present are bentonite which may be present in from 0.1 to 1 weight percent and an alkali metal salt of phenol sulfonic acid, e.g., sodium phenol sulfonate, which may be present in from about 0.1 to about 0.3 weight percent.

The sulfonate or sulfate emulsifiers will normally be hydrocarbon sulfonates and sulfates. The emulsifiers will usually have molecular weights in the range of about 265 to 450, more usually from about 280 to 400. The hydrocarbon groups will be aliphatic, alicyclic or alkyl-substituted aromatics. The hydrocarbon group may have from 0 to 2 sites of aliphatic unsaturation.

The preferred sulfonates and sulfates are those having aliphatic hydrocarbon groups of from 14 to 30 carbon atoms, particularly preferred is an average of 14 to 20 carbon atoms. Individual sulfonates and sulfates may be used, or mixtures of various hydrocarbon groups having an average number of carbon atoms or molecular weight within the ranges indicated above. A particularly useful emulsifier is derived by the sulfonation of cracked wax olefins having an average number of carbon atoms in the range of 14 to 20, the individual olefins having from about 12 to 28 carbon atoms.

The final composition of the slurry seal prior to being laid and the emulsion broken will now be considered. Arbitrarily, all of the various components will be considered based on 100 parts of aggregate. All parts are by weight unless indicated otherwise. Usually, from 10 to about 30 parts of emulsion will be employed, more usually from about 15 to 25 parts. In the emulsion will be about 5 to 21 parts of bitumen, more usually from about 5.5 to 16 parts. The emulsifiers will be present in from about 0.02 to 0.6 part, more usually from 0.04 part to 0.3 part. Depending on the particular emulsifier employed, there usually will be from about 0.03 millimole to about 3 millimoles, more usually from about 0.05 millimole to about 2.5 millimoles. With the preferred aliphatic hydrocarbon sulfonates, the preferred range is 0.12 millimole to about 1.0 millimole.

The amount of water added to provide the necessary high pH level and the multivalent cation would normally be from about 5 to 25 parts, more usually from 10 to 20 parts. The total amount of water present (including the water in the emulsion) will usually be in the range of about 7.5 to 40 parts, more usually from about 14 to 32 parts.

The amount of multivalent cation employed will normally be greater than about 0.5 mole and up to about 9 moles per mole of sulfonate or sulfate, more usually from about 2 to 6 moles per mole of sulfonate or sulfate emulsifier. With calcium as the initiator, the calcium will be used in about 2 to 6 moles per mole of emulsifier. This will be from about 0.01 to 0.25 part of Ca per 100 parts of aggregate with preferred compositions.

The emulsifier employed will generally distribute itself between the surfaces of the bitumen particles and the aqueous phase in the emulsion. The less emulsifier used, the less emulsifier there will be in the aqueous phase. It is believed that the emulsifier in the aqueous phase acts to remove the multivalent cation as an effective set initiator. Therefore, the more of the emulsifier that is employed, the more set initiator that will be required.

In effect, the emulsifier in the aqueous phase serves to stabilize the emulsion against breaking. Therefore, during the mixing, additional sulfonate can be added, if unusual circumstances are causing too rapid a break of the emulsion. A too rapid break can occur during the mixing or subsequent to the mixing when the pavement is being laid resulting in the slurry seal forming a noncohesive weak structure. It may be necessary when increasing the amount of the emulsifier, all of the conditions remaining the same, to also increase the amount of set initiator.

In addition, larger amounts of water also tend to retard the development of strength in a slurry seal mix. This effect of excess water may be corrected, up to a point, by using larger amounts of the set initiator. It is also found that if the pH exceeds a certain point, 13 or above, particularly with calcium, the setting rate is retarded. However, this can vary with other cations. The stability of the slurry seal is also dependent upon the nature of the aggregate. Limestone tends to destabilize the slurry seal more than silica or siliceous aggregate. Furthermore, the other variables that tend to stabilize the slurry seal and provide a uniform pavement should also be modified in relationship to the aggregate employed.

The ambient temperature at which the laying of the slurry seal is carried out also affects the rate at which the slurry seal sets. The higher the temperature, the faster the rate. Therefore, depending upon the temperature at which the slurry seal is being laid, a more or less stable slurry seal system will be employed.

In order to demonstrate the effectiveness of using a liquid set initiator to enhance the setting of the slurry seal, a number of experiments were carried out varying the amount of the multivalent initiator, particularly calcium, and the amount of base which was added as sodium hydroxide, to provide the high pH desired. In the following experiments, 500 g. of granite dust were mixed with a calcium chloride solution followed by addition of the caustic solution, the mixture then mixed, followed by rapid addition of 100 g. of an anionic emulsion. The anionic emulsion comprises 63 weight percent of an 85/100 penetration asphalt, 0.5 weight percent of bentonite, 0.65 weight percent of alpha-olefin sulfonate prepared by the sulfonation of cracked wax olefins having from 15 to 18 carbon atoms (see French Patent No. 1,419,652), and the remainder water. The following table gives the compositions employed and the penetration results for a variety of times after the slurry seal has been spread.

TABLE I

| 10 wt. % $CaCl_2 \cdot H_2O$ Soln., g. | 0.65 wt. % NaOH Soln., g. | Add'l. $H_2O$ Added | Penetration test P-8[1] in decimillimeters Min.: 10 | | 30 | 60 |
|---|---|---|---|---|---|---|
| 45 | 45 | 0 | 35 | 15 | 10 |
| 20 | 45 | 25 | 35 | 15 | 10 |
| 20 | 22 | 48 | 50 | 25 | 20 |

[1] P-8 Method. The slurry aggregate is poured into a can lid. Consistency is measured over spaced time intervals using a modified grease cone. The penetrometer meets the requirement of ASTM D5-65. The can lid is 6'' in diameter and ¾'' in height. The temperature is 77°F, the load 400 g. and the time 5 seconds. The cone is modified by removing the steel tip.

Additional experiments were carried out employing barium chloride and strontium chloride solutions. Slurry seal mixes were prepared by using 500 g. of No. 1 gradation of Logan Quarry granite dust aggregate, 100 g. of the emulsion previously described and 70 g. of aqueous solution of strontium chloride hexahydrate and barium chloride dihydrate at varying pH's. The amount of strontium chloride and barium chloride as their indicated hydrates are reported in weight percent based on aggregate. With the strontium chloride in from about 0.08 to 0.12 weight percent, excellent slurry seal pavements were obtained in the range from about 12.5 to 12.8 pH. With the barium chloride in from 0.08 to 0.12 weight percent, excellent slurry seals were obtained at pH's in the range from about 12 to 13 with diminishing amounts of barium chloride with increasing pH.

The next series of tests employed 100 parts of granite dust, 20 parts of the previously described bitumen emulsion and a total of 16 parts of water containing the calcium chloride dihydrate and the sodium hydroxide. The calcium chloride and sodium hydroxide were either mixed immediately before being added to the aggregate or added separately to the aggregate. The emulsion was then added to the prewet aggregate followed by a one-minute mixing cycle. With 0.07 to 0.13 weight percent sodium hydroxide based on aggregate (pH from about 12.5 to 13), the calcium chloride dihydrate weight percent based on aggregate could be varied from about 0.2 weight percent to about 0.8 weight percent and rapid setting of the slurry seal to a cohesive structure achieved.

With limestone aggregate in place of the granite, with from about 0.05 to 0.3 weight percent sodium hydroxide based on aggregate, the calcium chloride dihydrate amount was varied from 0.2 to 0.8 weight percent based on aggregate with good results. When the additional water was reduced to 12 weight percent based on aggregate, and employing a silica aggregate, the weight percent of sodium hydroxide based on aggregate was preferably from about 0.05 to 0.2, the amount of sodium hydroxide increasing with the amount of calcium chloride dihydrate employed which was varied from about 0.2 to about 0.8 weight percent based on aggregate.

It is evident from the above results that rapid setting slurry seals can be obtained by the use of liquid initiators. The advantages of liquid initiators are manifold. Solutions are much more closely metered than the addition of solids, where small amounts of solids are added in comparison to the gross amount of material being employed. Because of the liquid nature of the initiator, more complete and intimate distribution of the initiator with the aggregate and ultimately with the emulsion can be achieved. Greater versatility in the choice of multivalent salts is available, particularly where special setting features are required or under unusual circumstances relative to the nature of the aggregate or field conditions. Furthermore, activation of the entire aggregate surface is achieved to optimize adhesion of the asphalt to the aggregate. Thus, a longer lasting structurally stronger surface is achieved.

I claim:

1. A method for laying pavement which comprises:
    mixing a mineral aggregate having a mean particle size between about 4 and 200 mesh U.S. standard sieve with a solution consisting essentially of (1) water, (2) a soluble salt of a multivalent metal selected from magnesium, calcium, strontium, aluminum, barium or mixtures thereof, and (3) an alkali metal hydroxide in an amount sufficient to impart a pH of greater than 11 to said solution, for a period sufficient to substantially wet the surface of said mineral aggregate;
    mixing the surface wet aggregate with 10 to 30 parts per 100 parts of aggregate of an anionic bituminous emulsion having from about 50 to 70 weight percent paving bitumen and from 0.2 to 2 weight percent of a $C_{14}-C_{30}$ hydrocarbon sulfate or sulfonate emulsifier to form a paving composition; and spreading the paving composition onto a surface at a thickness of at least 1/8-inch whereby the mixture rapidly sets into a stable cohesive pavement; said water being present in said paving composition in an amount equal to 5 to 25 parts per 100 parts of said aggregate and said multivalent metal being present in an amount of 0.3 to 9 moles per mole of said emulsifier.

2. A method according to claim 1 wherein said multivalent metal is calcium, the alkali metal hydroxide concentration is in the range of a pH of from 12 to 13 and the calcium is present in from 2 to 6 moles per mole of emulsifier.

3. The method according to claim 1 wherein said bituminous emulsion has from 0.1 to 1 weight percent of bentonite.

4. The method according to claim 3 wherein said bituminous emulsion has from 0.1 to 0.3 weight percent of alkali metal phenol sulfonate.

5. The method according to claim 1 wherein said hydrocarbon sulfonate emulsifier is an aliphatic hydrocarbon sulfonate having an average of from 14 to 30 carbon atoms.

6. The method according to claim 5 wherein said emulsifier is derived by the sulfonation of cracked wax olefins having an average number of carbon atoms in the range of 14 to 20.

7. The method according to claim 1 wherein said multivalent metal is barium or strontium.

8. The method according to claim 1 wherein said mineral aggregate is siliceous, the concentration of alkali metal hydroxide is in the range of a pH of 12 to 13, and the multivalent metal is derived from calcium chloride dihydrate which is present in from 0.2 to 0.8 weight percent based on the aggregate.

9. The method according to claim 1 wherein said aggregate is limestone, the alkali metal hydroxide is derived from sodium hydroxide which is present in from 0.5 to 0.3 weight percent based on aggregate and said multivalent metal is derived from calcium chloride dihydrate which is present in from 0.2 to 0.8 weight percent based on aggregate.

* * * * *

PO-1050
(5/69)

UNITED STATES PATENT OFFICE
CERTIFICATE OF CORRECTION

Patent No. 3,695,152          Dated October 3, 1972

Inventor(s) PETER E. GRAF

It is certified that error appears in the above-identified patent and that said Letters Patent are hereby corrected as shown below:

Col. 8, line 19, "0.5" should read --0.05--.

Signed and sealed this 20th day of February 1973.

(SEAL)
Attest:

EDWARD M. FLETCHER, JR.          ROBERT GOTTSCHALK
Attesting Officer          Commissioner of Patents